(12) United States Patent
Aarabi

(10) Patent No.: US 10,713,704 B2
(45) Date of Patent: Jul. 14, 2020

(54) SYSTEM AND METHOD FOR GENERATING OUTPUT RESULTS BASED ON COMPUTED RELATIVITY MEASURES USING RELATIONAL MEMORY

(71) Applicant: L'OREAL, Paris (FR)

(72) Inventor: Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 304 days.

(21) Appl. No.: 15/798,838

(22) Filed: Oct. 31, 2017

(65) Prior Publication Data
US 2019/0043113 A1    Feb. 7, 2019

Related U.S. Application Data

(60) Provisional application No. 62/541,739, filed on Aug. 6, 2017.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0201* (2013.01)

(58) Field of Classification Search
CPC ..... G06Q 30/0251–0277; G06Q 30/06; G06Q 30/0601–0643; G06Q 30/08
See application file for complete search history.

(56) References Cited

U.S. PATENT DOCUMENTS 6,223,215 B1 *  4/2001  Hunt ............... G06Q 30/02
                                                 709/203
7,685,074 B2    3/2010  Linden et al.
(Continued)

FOREIGN PATENT DOCUMENTS

CA       2915242 A1    6/2016

OTHER PUBLICATIONS

Uncovering Patterns in Cybershopping. Wendy W. Moe, Peter S. Fader. California Management Review. col. 43, No. 4. Summer 2001. (Year: 2001).*
(Continued)

*Primary Examiner* — William J Allen
(74) *Attorney, Agent, or Firm* — Oblon, McClelland, Maier & Neustadt, L.L.P.

(57) ABSTRACT

A system and method compute, store and use relativity measures between events in datasets where the measures are stored in a relational memory for querying. From user data and e-commerce shopping session data, relativity measures are computed for a plurality of subsets of data attributes of the user data and session data, each subset comprising two or more data attributes. The relativity measures individually or when combined represent conditional relativities between a set of events within the session data. Only the relativity measures are stored to the relational memory. The measures may be queried for results and applied to the e-commerce service (e.g. to determine which specific product data to present or an order of the presentation of the specific product data). The relativity measures may be computed only for pre-selected relations between particular data attributes which give desired trends and insights into user shopping using the e-commerce service.

18 Claims, 13 Drawing Sheets

(56) References Cited

U.S. PATENT DOCUMENTS

| | | | | |
|---|---|---|---|---|
| 2003/0065578 A1* | 4/2003 | Peyrelevade | ........ | A45D 44/005 |
| | | | | 705/14.54 |
| 2005/0071251 A1* | 3/2005 | Linden | ................... | G06Q 30/02 |
| | | | | 705/14.54 |
| 2009/0216910 A1* | 8/2009 | Duchesneau | ......... | G06F 9/5072 |
| | | | | 709/250 |
| 2015/0134478 A1* | 5/2015 | Dicker | ............... | G06Q 30/0633 |
| | | | | 705/26.8 |
| 2016/0171588 A1* | 6/2016 | Linden | ............... | G06Q 30/0631 |
| | | | | 705/26.7 |
| 2018/0075516 A1* | 3/2018 | Barkan | .............. | G06Q 30/0631 |

OTHER PUBLICATIONS

International Search Report dated Oct. 25, 2018 for Corresponding International PCT Patent Application No. PCT/CA2018/050939; 3 Pages.
Written Opinion dated Oct. 25, 2018 for Corresponding International PCT Patent Application No. PCT/CA2018/050939; 3 Pages.
Sephora USA, Inc., Try on Lip Shades Instantly Dated Feb. 26, 2016; 1 Page.

* cited by examiner

Relational Memory

Random Access Memory

0 Lipstick1, Lipstick2, Eye Shadow1, Buy

1 Lipstick2, Eye Shadow1, Lipstick3 Eye Shadow2

2 Lipstick1, Eye Shadow2, Lipstick2, Eye Shadow1

3 Lipstick3, Eye Shadow2, Lipstick1, Buy

4 Lipstick3, Eye Shadow2

5 Lipstick2, Eye Shadow1, Buy

6 Lipstick1, Lipstick3, Eye Shadow2

7 Eye Shadow1, Lipstick1, Lipstick2, Eye Shadow1, Buy

I hope all is well. I've been busy analyzing Smashbox-sponsored Makeup app.
Let's start our weekly update with a few highlights:

- Total user "More Details" button clicks: 915
- Average shade try-ons per session 24.9
- Average number of shades focused on (as determined by *eye* tracking) 13.2

These are the most popular product categories this week overall:

- ALWAYS ON LIQUID LIPSTICK with 30.2% of try-ons
- EYE LINER with 10.5% of try-ons
- MASCARA with 9 9% of try-ens ... and these are the most popular categories where people pressed the "More Details" button:

- ALWAYS ON LIQUID LIPSTICK with 65.5% of try-ons (with
- HIGHLIGHT SHADOW with 9.8% of try-ons
- BE LEGENDARY LIPSTICK with 4.7% of try-ons

Fig. 4

I had a little extra time this week, so I decided to look more closely into the Lid Shadow category and found the following shades tried on:

- Full Exposure Palette (1$^{st}$ specific colour shown), with 13.7% of try-ons (with a 15.6% lower share of gaze compared to try-ons)
- Full Exposure Palette (2$^{nd}$ specific colour shown), with 3% of try-ons (with a 22.3% lower share of gaze compared to try-ons)
- Cover Shot Eye palettes (3$^{rd}$ specific colour shown), with 3% of try-ons (with a 3% lower share of gaze compared to try-ons)

On a side note I noted that for sessions where the user pressed the call-to-action button, a noticeably common sequence of shades tried-on was Be legendary Liquid Lip (4$^{th}$ specific colour shown) and Cover Shot Eye Palettes (3$^{rd}$ specific colour shown) occurring together 1.84% of the time (which is a much higher pair-wise occurrence as compared to their individual occurrences of 0.11% and 0.07$% respectively).

Fig. 5

SYSTEM AND METHOD FOR GENERATING OUTPUT RESULTS BASED ON COMPUTED RELATIVITY MEASURES USING RELATIONAL MEMORY

CROSS REFERENCE

This application claims the benefit of U.S. Provisional Application No. 62/541,739 filed Aug. 6, 2017, the contents of which are incorporated herein by reference.

FIELD

This disclosure relates to data storage optimization and to computing systems and methods to process data to optimize storage and use data optimized for storage and/or retrieval, such as for use to define data for presentation dynamically. More particularly this disclosure relates to computing systems and methods using relational memory.

BACKGROUND

Many different contexts exist where large datasets require storage and processing. Optimizing data storage may reduce the amount of storage required. Optimizing data storage may enable faster processing (i.e. use) of the data for example, to determine certain desired information from the data.

With an ever increasing amount of data on consumer shopping behaviour on e-commerce applications and websites, it is of great necessity to analyze this data to decipher consumer interest, shopping preferences, and their ideal product matches. A number of applications and algorithms have been proposed and applied to a sub-segment of the data collected for e-commerce applications, including collaborative filtering [1] and clustering of customers into specific segments for which unique products would be recommended [2]. The essential idea behind these methods is to use the data as a means of predicting the intent of the customer based on which a product is suggested. Success in the form of a good suggestion will result in a higher conversion rate, and ultimately, an increase in sales for the e-commerce app or site.

A common approach in analyzing e-commerce data has been the application of machine learning approaches such as deep learning [11] and support vector machines [4]. For example, [5] used multiple recurrent neural networks to categorize e-commerce items. These methods provide the means to analyze the data based on prior user sessions which can be readily obtained. Using such approaches to personalize recommendations can usually be effective, as shown in [6] and [7]. In [7], feature engineering was applied to e-commerce data from Alibaba's T-mall dataset for the binary classification of buyers into repeat buyers and non-repeat buyers.

An interesting approach was taken by [3], where a special data structure which was specifically designed for optimized searching and matching of data was used for analyzing e-commerce data. The idea here was that part of the computation would be performed prior to storage of the data, enabling more efficient real-time analysis during new user sessions. An approach similar along these lines was that of [8], which utilized pair-wise co-occurrences for retail data mining. Essentially, [8] used the joint distribution between pair-wise variables in order to understand retail behaviours.

SUMMARY

This disclosure relates to systems and method of storing data based on relational memory. By computing conditional relativities between a set of events (not necessarily limited to pair-wise), and storing only these relativity parameters in memory instead of the raw data, several tasks such as real-time data analysis, data storage, and processing of unstructured data become easier to perform.

There is described a method for learning relationships between events by accounting for the spatial or temporal sequence of occurrence of the events. An underlying idea behind the proposed method is that for certain data processing applications, such as data collected from retail shoppers, relational access to data is more useful and immediately informative than sequential access. A proposed RElational Memory (REM) model may be applied on large datasets and temporal relativity maybe utilized in determining the relationships between user actions.

There is provided a computing system comprising one or more processors coupled to a storage device storing instructions which when executed by the one or more processors configure the computing system to: receive user data for users performing shopping session instances with an e-commerce service; receive session data for each of the respective shopping session instances; compute relativity measures for a plurality of subsets of data attributes of the user data and session data for storing to a relational memory, each subset comprising two or more data attributes and wherein the relativity measures individually or when combined represent conditional relativities between a set of events within the session data; receive a query from an e-commerce service for output generated from the relativity measures stored to the relational memory; search the relational memory to determine the output results responsive to the query; and provide the results to the e-commerce service.

Computer implemented method and computer program product aspects are also provided. Computer program products comprise a non-transitory storage device (e.g. memory, disk, etc.) storing instructions for configuring the execution of one or more processors of a computing device.

BRIEF DESCRIPTION OF THE DRAWINGS

FIG. 4 is a representation of initial statistics about popular shades and products tried on.

FIG. 5 is an example of a report showing a deeper exploration of particular categories, and relational analysis of shades tried on for sessions that lead to a sale.

DESCRIPTION

Relativity Measurement

Figure 1:
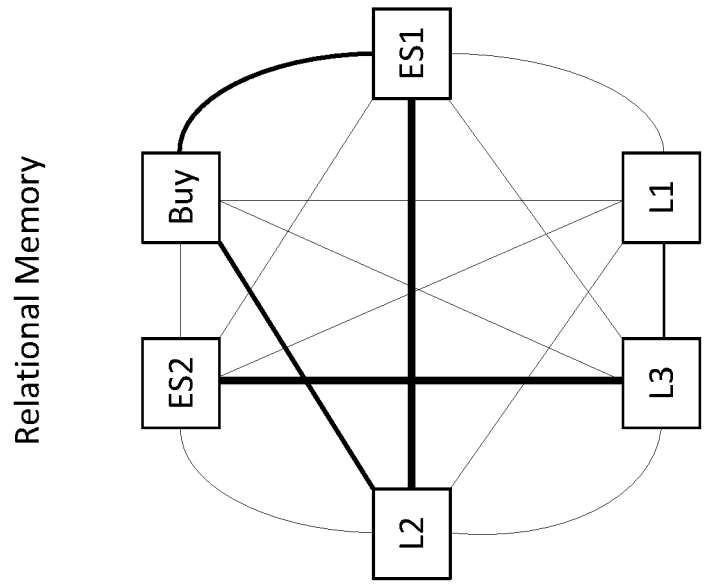
FIG. 1 is a depiction of Random Access Memory and Relational Memory, where RAM stores all user actions and REM stores a relational table.

There are a large number of problems where the goal is to find the degree of closeness between a group of specific events or objects. For example, given a collection of images, we could determine the relationship between the individuals in the photos. Given a series of actions taken by a shopper, we could determine the relationship between a user trying on a red lipstick and purchasing a product. Or, given a series of articles about a particular stock and the performance of the stock, we could determine the relationship between specific article phrases and the stock performance. These relationships could also be conditional, such that the relationship between events or objects is conditioned on certain criteria. One example of this would be the relationship between pairs of makeup products tried on conditioned on sessions which end in a user purchase.

At this point, let us define our problem more formally. We assume that there are a large number of independent random experiments that are performed, with each experiment consisting of a certain set of events. Each event within an experiment would consist of an event identifier, as well as specific parameters that define the event in a certain space. For example, in the case of people in images, each image would be an independent experiment, the event identifiers would be the names of the people, and the parameters would be the exact 2D location of each person within the image. In the case of shoppers using a virtual makeup try-on app, each experiment would be a specific shopping session, and the events would be the actions that the shopper takes (e.g. tries on a product, buys a product, etc.). In this scenario, the time in which actions are taken would be the defining parameter for each event.

The simplest measure of closeness in the setup described above would be the joint probability of the group of events whose closeness we want to measure, which we can estimate empirically as shown below:

$$P^*(S) = \frac{N_S}{N_T}$$

where S is the event set whose closeness is of interest, $N_S$ is the number of occurrences of the event set S, and $N_T$ is the total number of experiments. In the limit as the number of experiments approach infinity, the empirical estimate above approaches the joint probability of the event set S.

An inherent problem with measuring the joint probability as outlined above is that it does not account for the relative closeness of the events in set S. For example, if the events in set S for one experiment are far apart, and for another experiment are very close, then they would count the exact same way.

In certain classes of problems, such as people tagged in images or items bought during an online shopping session, the resulting outcomes have a spatial (or temporal, although we can account for time as any other physical dimension) arrangement which tells us how close two outcomes are among all of the set of outcomes from each experiment (i.e. distance between tags, time between two products added to the cart, etc.). This spatial information can help us get a better reading on the relativity between a set of outcomes.

A. Spatially Distributed Events

In the case that the outcomes of each experiment are spatially distributed on a 2D plane, we can estimate the degree of relation (i.e. the relativity) between outcomes A and B as follows:

$$r_i(A, B) = \frac{\min_{A,B} d_i(A, B)}{d_i(A, B)}$$

where $d_i(A,B)$ is the cartesian spatial distance between tags A and B in image i.

This score is equal to 1 if the distance between two tags is the smallest in the image, and less than 1 for other spatial tags.

B. Temporally Distributed Events

In the case of objects distributed temporally, such as actions performed by a shopper during a shopping session, we can estimate the relativity contribution between two outcomes as follows:

$$r_i(A,B) = e^{-|t_i(A) - t_i(B)|/\sigma}$$

where $t_i(A)$ and $t_i(B)$ could be either the actual time of the two outcomes A and B in experiment i, respectively, or they could be the index of the order of occurrence for the outcomes A and B in experiment i (i.e. if A was the second outcome, and B the 7th outcome, then $t_i(A)=1$ and $t_i(B)=6$). Varying the size of a varies the temporal window. The smaller the value the larger the window.

C. Multiplicative Events

In cases where objects in an experiment have a specific visibility of the experiment, then the relativity between two objects would be as follows:

$$r_i(A,B) = v_i(A)v_i(B)$$

where $v_i(A)$ and $v_i(B)$ are the visibilities of events A and B for the experiment i, respectively.

One way of visualizing multiplicative outcomes is that each experiment contains translucent windows to a set of objects. The visibility between two objects, crossing two windows, results in a combined visibility attenuation.

D. Pair-Wise Relativity

The relativity scores above define the relation between a pair of outcomes in a specific experiment. To obtain the overall relativity between two pairs of outcomes based on a number of experiments, we can compute the overall relativity as follows:

$$R(A,B) = \Sigma_i r_i(A,B)$$

The above relativity should be normalized, either by the total number of experiments, or by the largest overall relativity between the pair of tags. Often, the absolute relationship is less important than the relative relationships. As a result, we will define the following normalized relativity score:

$$R^*(A, B) = \frac{R(A, B)}{\max_{A,B}(A, B)} \quad (\text{Eq. I})$$

such that the highest relativity scores between two outcomes is 1, and everything else is normalized according to this.

In the case that our set of events of interest S contains two events (A and B), and events have no spatial or temporal distribution, then the overall relativity score would be a scaled version of the joint probability in equation Eq. I as shown below:

$$R^*(A, B) = \frac{P^*(A, B)}{\max_{A,B} P^*(A, B)} = \frac{N_{A,B}}{\max_{A,B} N_{A,B}}$$

Relational Memory

Let us consider a list of M datasets each representing a particular experiment. Storing this data sequentially would essentially store each of the events in each experiment sequentially. If we only have N total events, with M>>N, then we could store the relativity information instead of the entire dataset in a $N^2$ matrix (assuming we only care about pair-wise relationships). This could be further reduced in cases were the relativity matrix is sparse. In cases where $M>>N^2$, relational memory is more efficient in terms of data storage than random access memory.

Essentially, what we are proposing is to store the information related to a set of experiments in a relative sense instead of an absolute sense. For example, the question asked would change from "What is stored at memory location 147?" to "What is the relation between events 11 and 52?"

FIG. 1 illustrates the essential difference between Relational Memory (REM) and Random Access Memory (RAM). The key question with REM is how does sequential data get parsed into relational data. The relativity measures outlined in the previous section provide a few methods for achieving this conversion. Let us evaluate the above relativity measures on a simple example involving user actions on a makeup e-commerce application, with actions as shown below:

Session 1—Lipstick, Shadow, Eyeliner, Buy
Session 2—Shadow, Lipstick, Eyeliner, Buy
Session 3—Lipstick, Mascara, Eyeliner, Buy
Session 4—Eyeliner, Buy, Mascara, Lipstick Considering two cases, one with joint probability and another with ordered temporal relativity (with σ=1.5), we get the following relativity list:

TABLE 1

Comparison of relativity scores based on joint probability and temporal relativity measures.

| Event Pair | Joint Probability | Relativity (with ordered temporal distribution and σ = 1.5) |
|---|---|---|
| Eyeliner-Buy | 1 | 1 |
| Lipstick-Buy | 1 | 0.252 |
| Shadow-Buy | 0.5 | 0.126 |
| Mascara-Buy | 0.5 | 0.342 |

As shown in Table 1, accounting for temporal distribution makes the eyeliner-buy relationship stand out much more clearly (since the two events always co-occur). Interestingly, the Mascara-Buy combination also moves up as a result of the temporal closeness between the two events for sessions 3 and 4.

There is some evidence that human memory is to a large extent relational, in that specific actions or events are stored not in their exact sequence, but in a relational form [12]. In fact, recent research has found a connection between damage to the hippocampus and loss of relational memory, indicating a direct relationship between the hippocampal activity and the establishment of relational memory [13]. Although the "Relational Memory" we are describing in this section is most likely very different than the relational memory we humans use, at a high level, saving information in a more processed format does have advantages with inspiration from biology.

Conditional REM

In many applications, we require relative information about events which share a certain underlying set of conditions. For example, in the case of retail data processing, we care about specific events or actions that lead to a sale. In these cases, it is more effective to construct one or more REM blocks each of which would be based on a set of conditions. For example, we could have one REM for cases that lead to a sale, and one REM for cases that do not. Understanding changes to the relativity of events for the different conditions can be very informative.

This conditional REM can be easily achieved by making the relativity calculations conditional instead of absolute. Instead of considering every experiment, we would instead consider a subset of the experiments for the relativity calculation. In the event that we do not account for spatial or temporal distribution, the relativity measurement would become a normalized conditional probability measure.

REM Implementation

Figure 2:
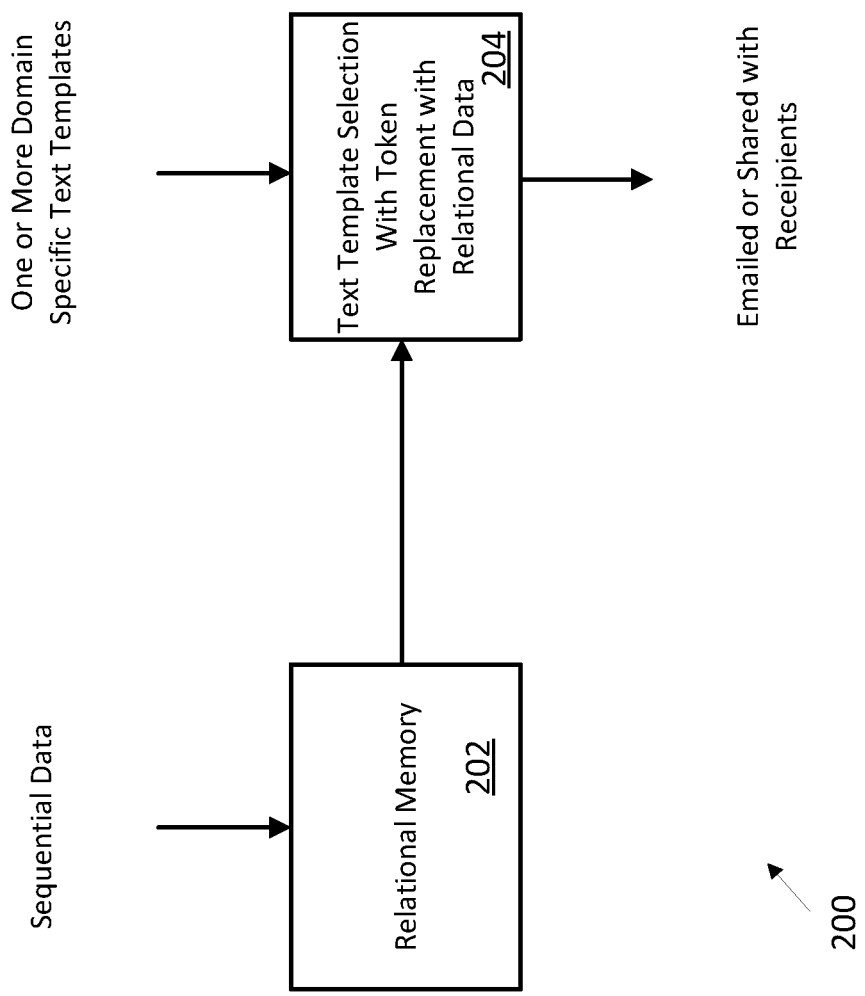
FIG. 2 is a block diagram illustrating the conversion of sequential data into a text report such as for emailing/sending to a user.

While the discussion here has been on the underlying data processing for finding relational information, it is useful to consider the presentation of this information to users. Relational data could be presented as graphs or tables, but an interesting user interface to access this data is conversational/textual. Domain specific aspects of the relations may be translated into a text-based report with tokens in place of the relational information as illustrated by the example of FIG. 2.

Furthermore, we can choose different text templates either based on specific criteria (include parameters in the original data or the relational data), or randomly. This way, the text templates would be fresh and unique, with a possibility that different templates would focus on different aspects of the data so that the user is always getting a unique vantage point on the data.

In order to better understand the benefits of REM, we implemented a simple conditional REM for a large retail dataset consisting of 24,193 shoppers using a popular mobile retailing iOS app. Conditioned on the users who clicked on a "More Details" button (915 out of 24,193) in the application, we explored the insights that REM based analysis could provide.

Each user on average took 39.1 individual actions, including 24.9 virtual shade try-ons, 13.2 gazes of the product name (as measured via eye tracking), and 1 action to click on a "More Details" button. Given the large number of actions per user session, analyzing the relationships between the specific actions had a potential of revealing unique shopper insights.

Figure 3:
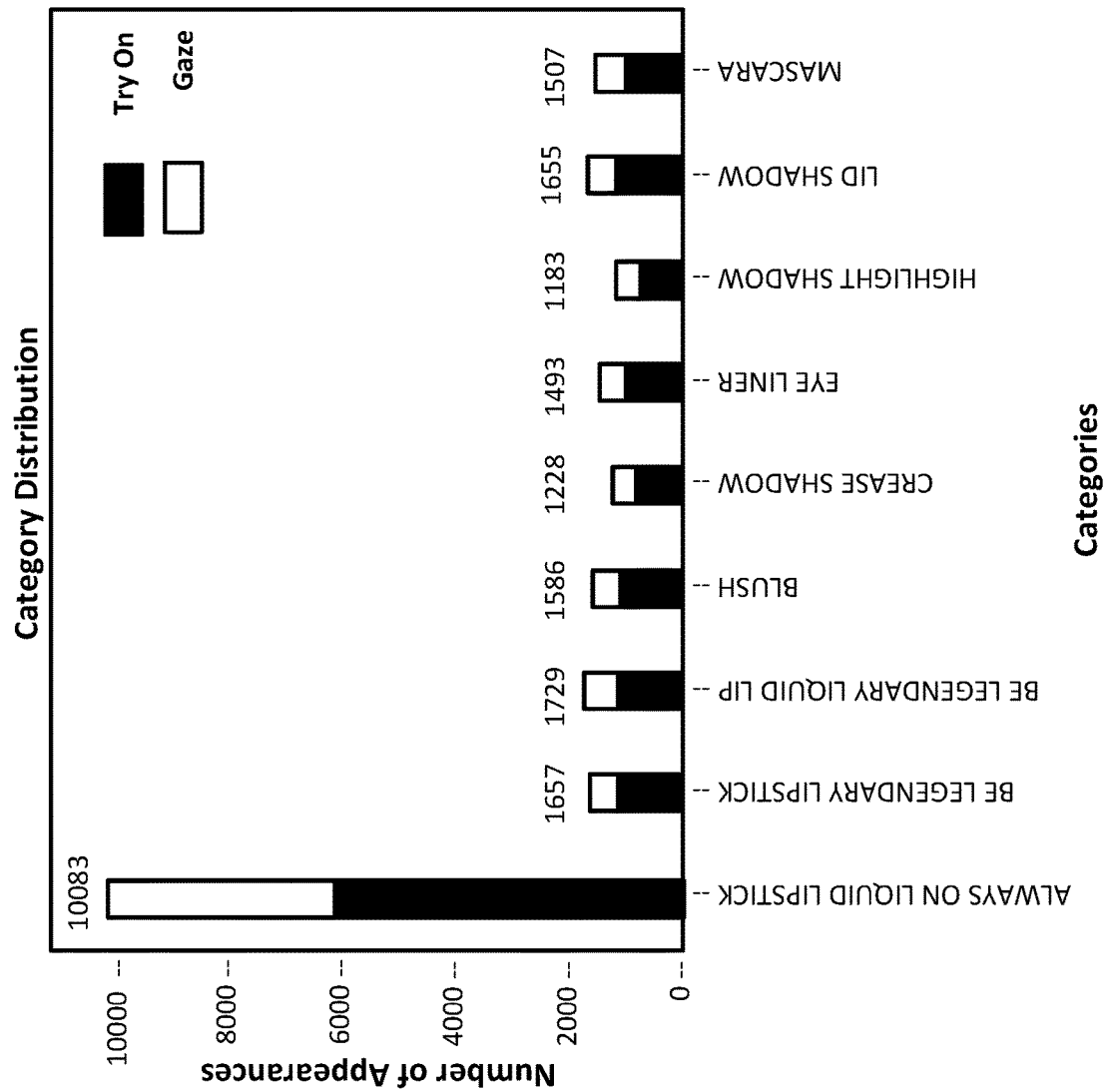
FIG. 3 is a graphical depiction of try-ons and gazes per product category.

FIG. 3 illustrates the breakdown of user try-on actions and gaze actions as a function of specific makeup categories from the Smashbox™ line of cosmetics (Smashbox is a trademark of DJF Enterprises Corporation). Here categories includes broader product categories such as "blush" as well as specific products. As shown, lipsticks were by far the most popular category for both try-ons and gaze, however, this was primarily due to the fact that the Always On Liquid Lipstick was the default product category.

In order to assess the relation between specific user actions and the eventual selection of the call to action button, our system first provided a high level overview of both the try-on and gaze activity from the app (including finding the most popular products), as shown in FIG. 4.

From here, a more detailed analysis was performed on specific categories (chosen randomly). As shown in FIG. 5, a detailed analysis of the Lid Shadow category reveals the top insights based on both try-ons and gaze. Also shown are the results of analyzing pair-wise relativity (temporal relativity with $\sigma=1.5$) and showing the pair of actions whose contribution to the total relativity score substantially outweighted their individual occurrence likelihood. In the example of FIG. 5, the pair-wise application of specific Lip and Eye Shadow products results in a relativity contribution (as a percentage of the total relativity score) of 1.84%, whereas their individual occurrence likelihoods are 0.11% and 0.07%.

In order to better understand the impact of different relativity measures on the results of the analysis, we compared the impact of running the relativity scores with A) no accounting for temporal distribution (i.e. $\sigma=\infty$), B) temporal accounting with $\sigma=1.5$, and C) temporal distribution with $\sigma=0.5$. Table 2 illustrates the top shade-pairs whose relativity contribution is substantially higher than their individual likelihoods. As shown, given that the order or point in which a shade is tried on is not factored in, most combinations tend to be generic popular products without any inherent association observable from the shade pairings.

TABLE 2

Top shade pairs whose relativity score contribution - with $\sigma = \infty$ - is far higher than the individual likelihoods of the shades being tried on. (where #N represents a particular shade of the product)

| Shade 1 | Shade 1 Occurrence % | Shade 2 | Shade 2 Occurrence % | Relativity Share % ($\sigma = \infty$) |
|---|---|---|---|---|
| Cover Shot Eye Palettes (#1) | 0.06 | Always On Liquid Lipstick (#1) | 4.47 | 1.77 |
| Be Legendary Liquid Lip (#1) | 0.33 | Always On Liquid Lipstick (#2) | 0.35 | 0.85 |
| Be Legendary Liquid Lip (#2) | 0.11 | Always On Liquid Lipstick (#1) | 4.47 | 1.87 |

Next we evaluated what would happen when temporal relativity was used with $\sigma=1.5$. Table 3 illustrates the top shade pairs in this case. As shown, in this case the relative pairings make more sense than the previous case. A bright eyeshadow with a dark eyeliner for example is a popular makeup trend which is coincidentally observed from the results here.

TABLE 3

Top shade pairs whose relativity score contribution - with $\sigma = 1.5$ - is far higher than the individual likelihoods of the shades being tried on. (where #N represents a particular shade of the product)

| Shade 1 | Shade 1 Occurrence % | Shade 2 | Shade 2 Occurrence % | Relativity Share % ($\sigma = 1.5$) |
|---|---|---|---|---|
| Be Legendary Liquid Lip (#2) | 0.11 | Cover Shot Eye Palettes (#2) | 0.07 | 1.84 |
| Cover Shot Eye Palettes (#3) | 0.11 | Photo Angle Gel Liner (#1) | 0.13 | 1.03 |
| Photo Op Eye Shadow Singles (#1) | 0.44 | Cover Shot Eye Palettes (#4) | 0.04 | 0.07 |

Pushing the relativity focus with $\sigma=0.5$, we obtain the results shown in Table 4. Here temporal relativity greatly matters, which results in specific combinations including bright shadow and lip colors and dark liner and lip shades. Interestingly, the trends observed here are different than the $\sigma=1.5$ case, showing the sensitivity of the analysis on the temporal distribution of the products.

TABLE 4

Top shade pairs whose relativity score contribution - with $\sigma = 0.5$ - is far higher than the individual likelihoods of the shades being tried on. (where #N represents a particular shade of the product)

| Shade 1 | Shade 1 Occurrence % | Shade 2 | Shade 2 Occurrence % | Relativity Share % ($\sigma = 0.5$) |
|---|---|---|---|---|
| L.A. Lights Palette (#1) | 0.04 | Be Legendary Liquid Lip (#3) | 0.08 | 0.78 |
| Always On Gel Eye Liner (#1) | 0.19 | Be Legendary Liquid Lip (#4) | 0.11 | 1.62 |
| Always On Liquid Lipstick (#1) | 4.47 | Always On Liquid Lipstick (#3) | 0.64 | 8.83 |

We are currently using the results of REM for a variety of additional tasks including making specific e-commerce changes (to hero products, images, product appearance order) based on the results of REM and any personal information on the user. "Hero products" are often a brands signature products emblematic of the brands defining traits and may be the brands main products being promoted at a given time. For example, if there is a stronger relation between blue eye shadows and users with an oval face, then upon detecting a user's face shape we dynamically readjust the type and promotion of products such that the products with the highest relativity to the user's information are promoted more visibly. This can also be done once a user has tried on, visited a certain product page, or added a product to basket. By knowing the relativity of other products to those acted on by the user, it becomes possible to recommend shades to complete a certain look.

Finally, the utilization of REM is not limited to just e-commerce data. REM and visual color detection may be used to analyze a large number of images on social media to understand the relativity between different makeup colors based on factors such as regional variation and personal variations due to skin tone, hair color, and face shape. This allows a system to have a basic understanding of product relativity even outside specific e-commerce data feeds.

All data categories (e.g. types of data attributes often associated with specific columns in a data set) may be treated the same. For example, you may want to ask "Give me the most popular skin tone conditioned on Paris" So, we have to treat all of the "columns" the exact same way.

---

A column could be a condition - something that we want to sort based on.
So a function call like this:
Evelin ( Condition_Set, Focus )
With Condition_Set being something like {country:"France";category:"lipstick";skin_tone:"dark"}
And Focus either being a singular focus such as {product_name} or dual focus such as {product_name,age_bucket} or more.
So, if we call with this:
Evelin ({country:"France";category:"lipstick";skin_tone:"dark"}, {product_name} ) should give this result:
Blue Haze Lipstick #11, 12%
Red Ruby Lip Pencil, 7%
Envy Me Lipstain in Orange, 5%
...
...
Whereas this call:
Evelin ({country:"France";category:"lipstick";skin_tone:"dark"}, {product_name,age_bucket}) would give this result (note that it gives a pair of product_name+age_bucket, along with a weight of the co-occurrence):
Blue Haze Lipstick #13, 20-25, 12%
Green Screen Lip Pencil, 15-20, 7%
Envy You Lip Drain in Purple, 15-20, 5%
...
...
A list of all data types (e.g. types of data attributes in the user data and session data) include:
product_name
product_id
product_color_rgb
product_color_category
category (product category)
date_time_range
location_exact
location_city
location_country
gaze,
try_on
add_to_cart
purchase
age
age_bucket
skin_tone
face_shape
eye_shape
hair_color
eye_color
wrinkles
spots
crows_feet
user_id
forehead_lines
fine_lines
skin_roughness
smile_lines
dark_circles

---

In addition to the list, there is a count of the total number of results found as well as a percentage compared to the total data points.

Example Embodiment

In one embodiment, there is disclosed a system for obtaining information about specific use actions on an e-commerce website, and being able to extract specific patterns and trends from this data.

Figure 6:
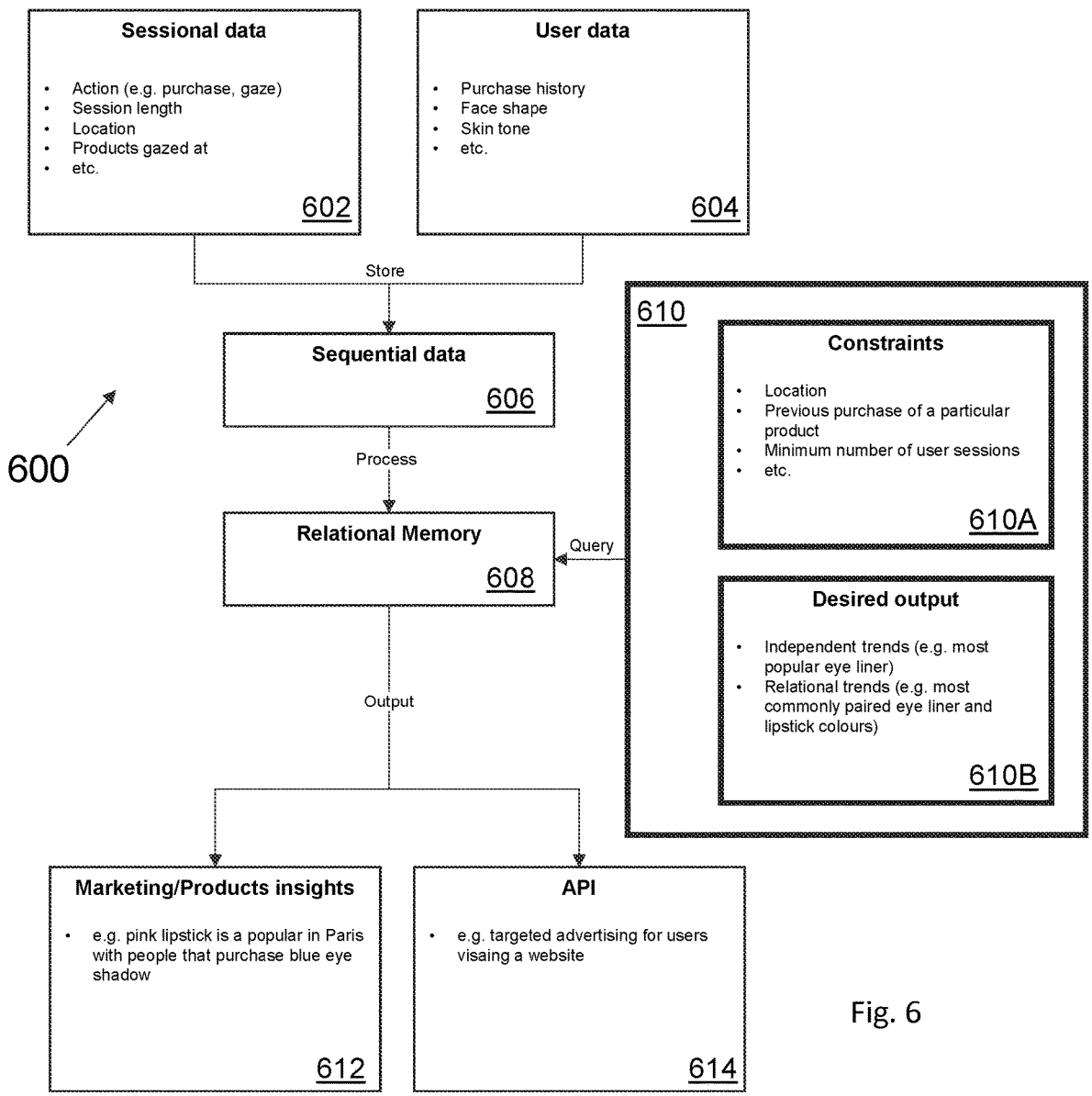
FIGS. 6-10 are block diagrams showing data stored in one or more data stores in accordance with an embodiment showing sequential data processed to relational memory data and respective queries against the relational memory data to produce respective outputs.
Figure 7:
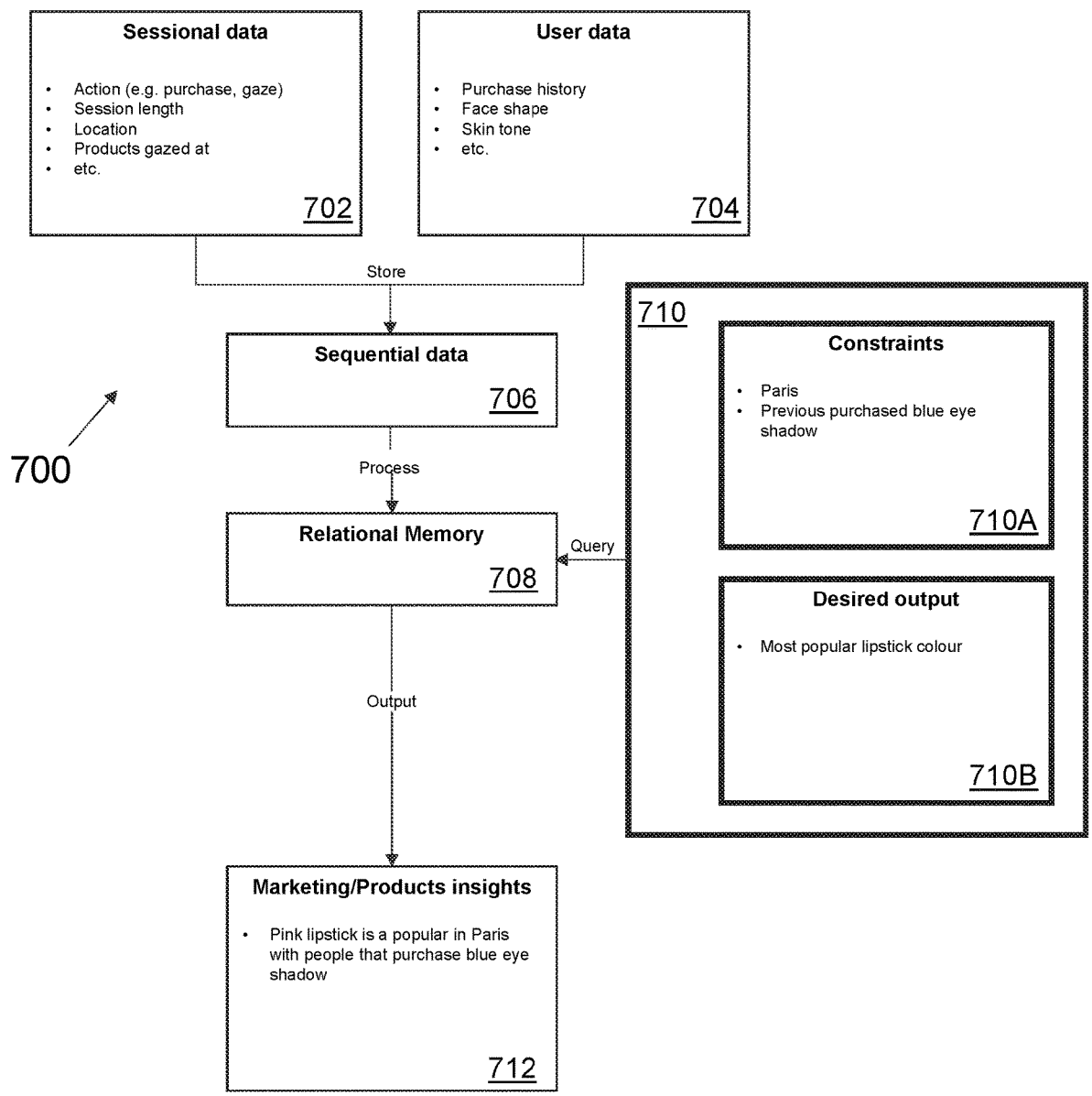
Figure 8:
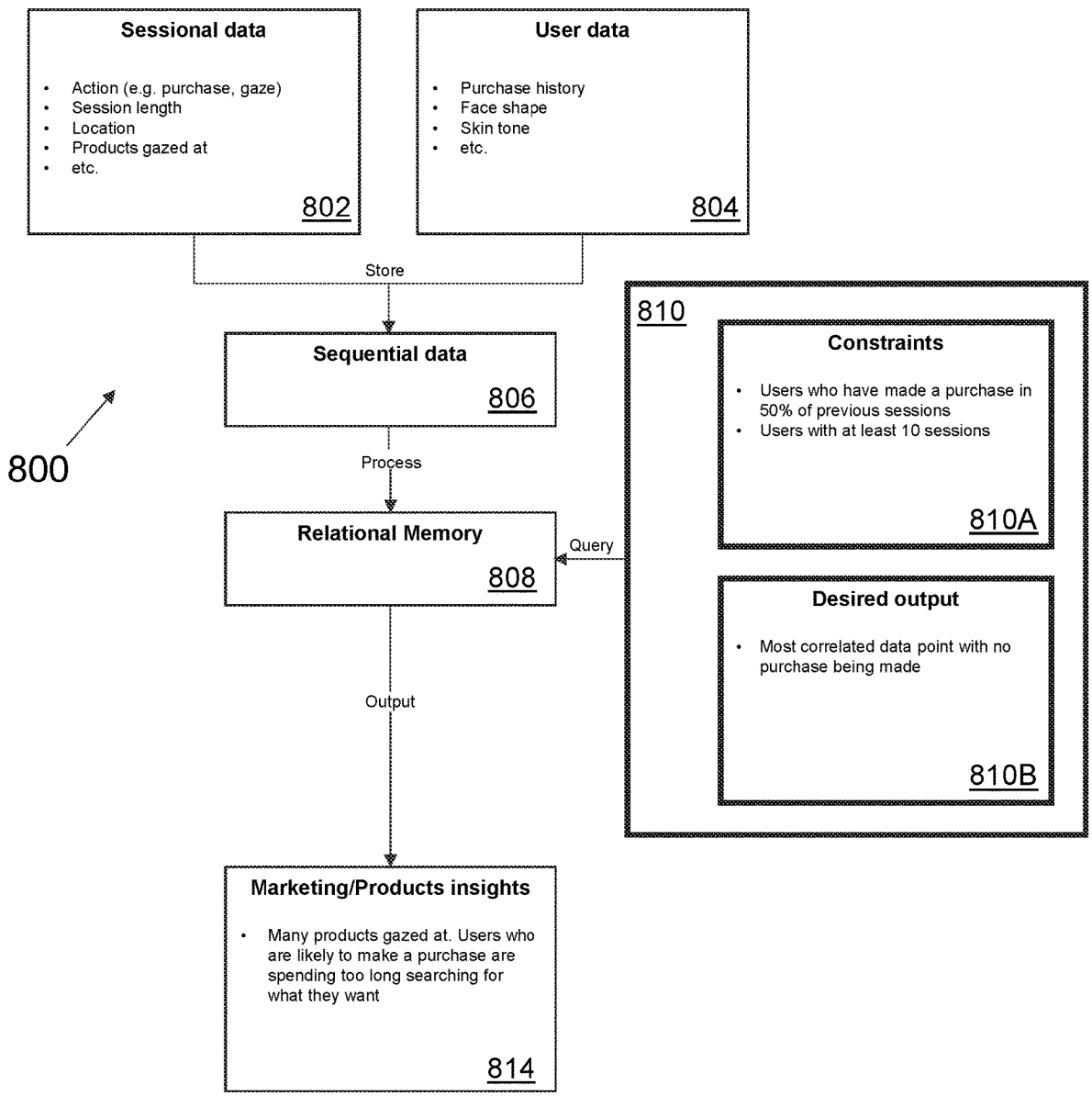
Figure 9:
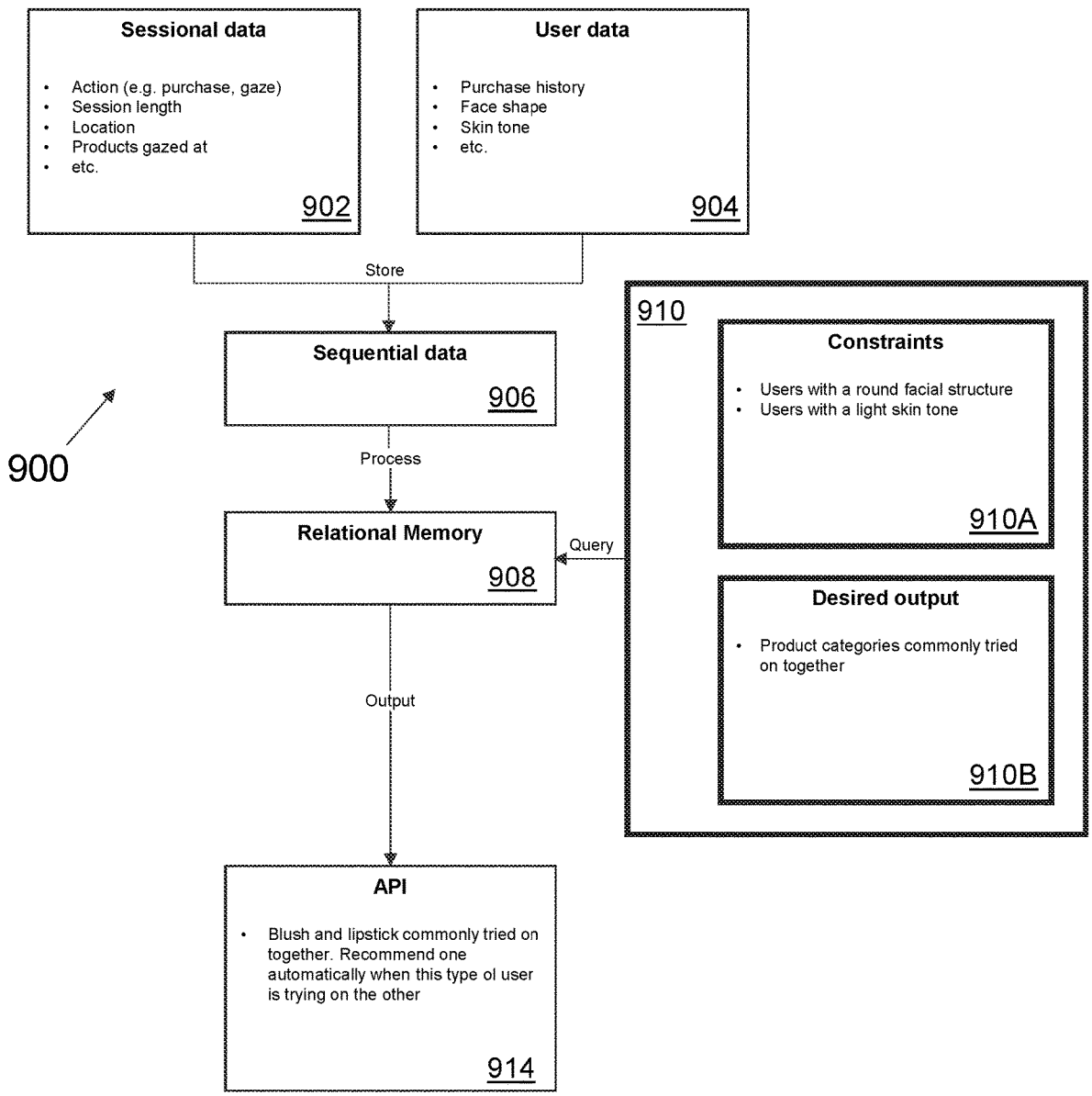
Figure 10:
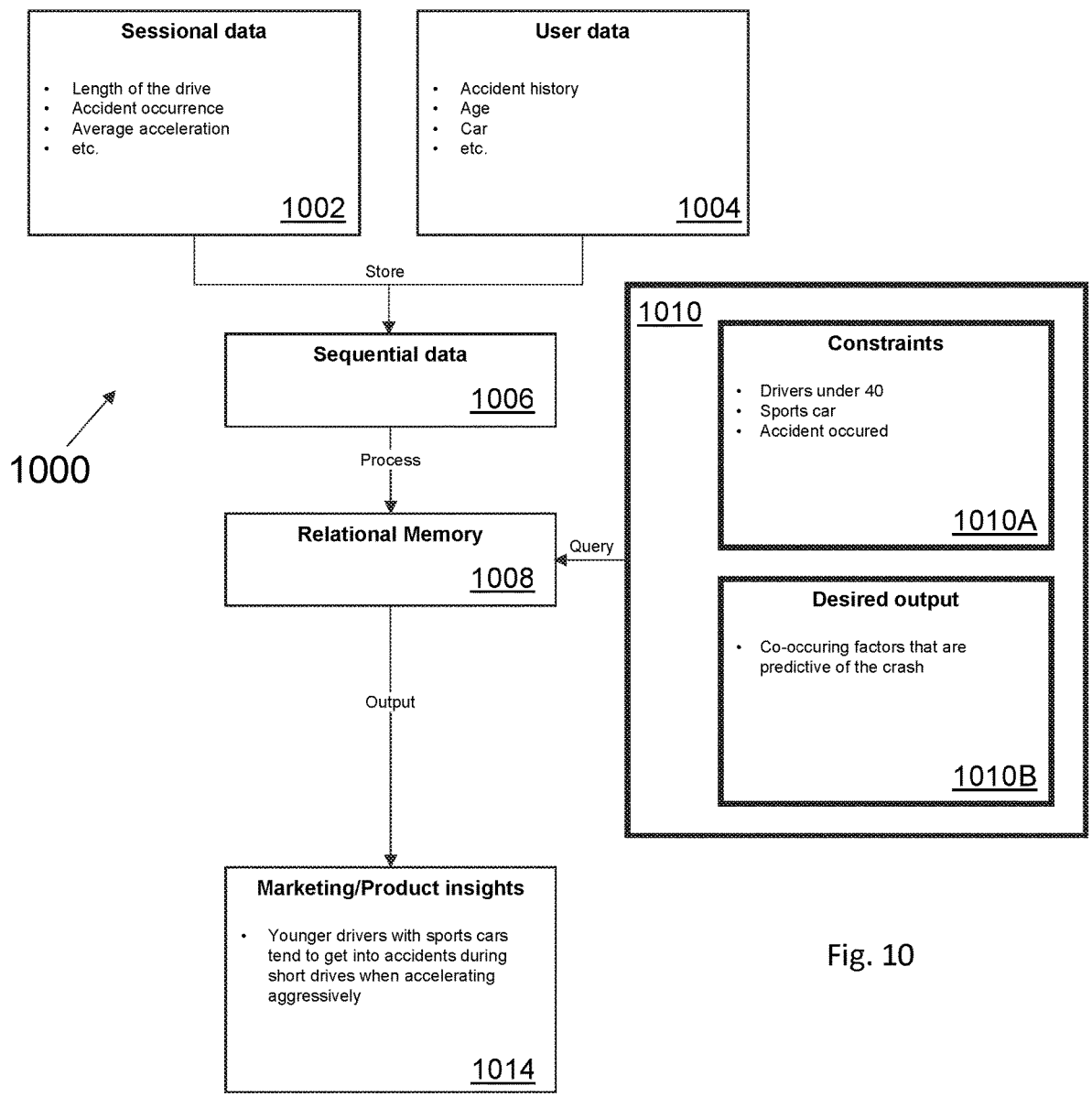

The general structure 600 of data (e.g. inputs and outputs) stored by a computing system such as an e-commerce system or platform selling products like makeup is shown in FIG. 6. The computing system may generate sessional data 602 for a shopping instance by a user having user data 604. Not shown in the structure 600 is e-commerce data such as products etc. for presentation to a user. Every session in the application or website is logged (sessional data 602 is stored as sequential data 606) with all of the actions that the user took, as well as important contextual information such as their location and the session length. Location may be determined during a session by an e-commerce service such as by use of a user device's IP address engaged with the service or from user profile data. More insight can be gained by including information on the users themselves (e.g. user data 604 is associated with sessional data in the logged sequential data 606), such as their physical features and history with the platform. These logs are added to a data store sequentially, but all of the data is processed to a relational structure (608) before being queried in order to find stronger trends. Thus in a method aspect, sessional data and associated user data is stored to a random access memory as sequential data, the stored session data is processed to determine relationships between aspects of the data, and the relationships are stored to a relational memory (e.g. a database). Session data includes products and actions (e.g. try on, gaze (e.g. eye tracking can determine actually viewing or a proxy may count data displayed), add to cart, purchase). Contextual data includes user data location, time/date and session length, etc. User data may include purchase history, face shape, skin tone, other user physical features, etc. which may drive or affect or correlate to choices of products.

Queries 610 are received to derive insight from the relational memory. When processed they typically return a sorted list of top event, for example. Queries 610 themselves follow a simple format. One specifies either a single output (e.g. the most popular product category) or a relationship (e.g. the two colours that are most often purchased together) (e.g. desired output 610B). Additional constraints (e.g. 610A) can then be specified in order to find trends that are specific to a subset of users. These additional constraints may drive further sorting (e.g. sort by constraint B within constraint B, etc.) Queries 610 may generate output 612 or 614. Valuable and non-obvious insights 612 can be gained for marketing purposes. Alternatively, an API can be exposed to provide a more tailored user experience (e.g. showing products that users will likely be interested in at the top of a list 614), defining data for presentation to a user dynamically, for example, based on the user's own user data, and current sessional data such as location and products gazed, tried on, etc.

Examples are provided to illustrate the basic usage of the technology. Examples in FIGS. 7-10 are similar to FIG. 6 such that structures 700, 800, 900 and 1000 are similar to general structure 600. Respective data components 702-712, 802-812, 902-912 and 1002-1012 are similar to components 602-612, varying in content for each respective example discussed herein. Though not shown in the examples of FIGS. 7-10, an API could be utilized to generate corresponding output to APi Output 612 to vary presentation data dynamically.

Say that blue eye shadow is selling well in Paris, and we wanted to recommend a lipstick that is likely to sell with it. With regard to FIG. 7, recommending the most popular lipstick is not an effective strategy, since people who specifically purchase blue eye shadow in Paris are likely to have different tastes and purchasing habits than the norm. With the relational model defined, however, the appropriate trend is picked up easily by specifying Paris and a previous purchase of blue eye shadow as constraints, as well as lipstick colour as the desired output. This output may be utilized to dynamically determine presentation information to a user (e.g. for a GUI) as the user uses an application or web site.

The model can also be used to reveal more complex trends without any change in the complexity of the query. For instance, having regard to FIG. 8, we can easily use the model to find out how to increase the conversion rate for users who are already willing to make purchases, even though there might be many possible solutions, none of which is clearly better than the other to a human analyst. To do this, we could condition the query on users who reliably make purchases by requiring them to have at least 10 previous sessions with a 50% conversion rate. Then, we need only use the relational model to find the data point most correlated with no purchase being made in a given session. As an example, the model might find that a high number of product gazes or a longer than usual session is highly correlated with these users not making a purchase, which would indicate that they are having trouble finding products that they want. Once we understand this, we could further use the model to find products that each particular user is likely to be interested in and display them at the top of a list. As a result, the graphical user interface may be determine dynamically responsive to the relational data. Further, the presentation of the data in the dynamically determined order results in less resource utilization. A user browses fewer options, finding a desired option sooner. This can result in less communication between the web site and the user device and less processing resources and energy consumption of the web site and user device.

One of the most powerful features of relational memory is that it makes finding inter-item trends simple and efficient. As an example, consider the task of finding the most prominent pair-wise makeup category trend for a particular subset of users. Having regard to FIG. 9, once we specify the constraints as usual, in this case a round face shape and light skin tone, the relational memory allows us to immediately find the most significant co-occurrences between categories, and from them the inter-category trends. An exposed API might be used to find that blush and lipstick are tried on most frequently together, in which case an online retailer could dynamically recommend one when this type of user is trying the other.

Although the makeup industry provides an excellent use case for a relational memory analytics model, it is worth noting that it need not be applied in this context, or even in the context of e-commerce for that matter. As just one other example and with regard to FIG. 10, consider an automobile insurance company that wants to monitor driver data in order to better price their plans. Relevant information that they collect might include the length of each drive, the driving style, whether an accident occurred, as well as customer data such as age and vehicle model. With this data, they could easily find trends for individual subsets of customers, such as the one described in the figure below where younger drivers with sports cars tend to get into accidents during short drives when accelerating aggressively. The trend may appear obvious in this case, but obscure and complex trends could just as easily be discovered using the same model.

Additional Query Examples

A system may be configured to receive queries in different ways. They may be generated in response to e-commerce shopping instances. That is, dynamically in response to events and user data in a current shopping instance a query may be generated by an e-commerce service to determine information to present to a user. Queries may be defined by a system user (e.g. an e-commerce service provider) who wishes to determine insights from the data. Queries may be generated automatically, for example, to pre-compute certain results that are regularly queried (by e-commerce service or system users) for storing in a look up cache. While the system may be configured to receive any query, some queries may produce more useful information than others. The following are suggestions which may assist with query formation to glean helpful information though a system may be configured to receive any query.

When the focus is a product feature, it may be preferred to always specify an action (e.g. purchase, add_to_cart, try_on) as a condition, to look for popularity and such actions define a criteria associated to popularity. When a focus is a user feature, results will likely be poorly measured if there is no tracking of users across multiple sessions and are instead every session is considered to correspond to a new user. This is because users that use the app very often will skew the results in a particular direction. Time oriented features may be defined and tracked (e.g. time_bucket_season and time_bucket_year) for use as a focus to find temporal trends. Using time_frame may not make sense, and its use limited to a constraint to specify how far back to go in time for the data in an analysis. Many multi-focus queries of the form {time_frame, user_feature} don't really have the potential to provide any useful insights. For example, it is very hard to see what useful information can be gleaned from a focus of {smile_lines, time_frame}.

QUERY EXAMPLES

Example 1

Give me the most common {product}, conditioned on {product_colour: red, category: lipstick, country: Paris, hair_colour: blonde, action: purchased, time_frame: past_year}.

Meaning: give the most popular red lipstick in the subset specified by the conditions, based on purchases.

Conclusions: Focus on a product feature gives insight on popularity. Focus on a product feature always requires an action to be specified, and only one action for the results to be meaningful in any way (i.e. popular relative to what criteria). Focus on a product feature makes sense with any combination of user and meta conditions.

Example 2

Give me the most common {action}, conditioned on {product: lipstick_a, category: lipstick, age_bucket: 20-25, time_frame: past_year}.

Meaning: give the most common actions and how common they are given the conditions. Here, it is less important to know what action shows up at the top of the list (it will almost certainly always be try_on), but rather the relative percentages of each action. Essentially, we are getting information on the conversion rate for these particular constraints.

Conclusions: Focus on action gives us insight on user conversion. Focus on action makes sense with any combination of user, product, and meta conditions. Conditioning based on a product and a category will render the category redundant, but that's not really an issue.

Example 3

Give me the most common {skin_tone}, conditioned on {product_colour: red, category: lipstick, face_shape: round, time_frame: past_year, action: try_on}.

Meaning: Give the most common skin tone and how common it is given the conditions. This type of query where the focus is on a user feature gives us trends about the users who meet the given conditions. Most useful for marketing purposes.

Conclusions: Focus on a user feature gives us insight on what kind of users. Focus on a user feature makes sense with any combination of user, product, and meta conditions.

Currently, where users are not tracked across multiple sessions, the insights gained may be incorrect to some extent. That is, because users who use an e-commerce site or app a lot and have multiple sessions will skew the results, especially if there is a trend in how much certain types of users use the site or app. For instance, imagine that in reality the most common skin tone of women meeting these conditions is dark, but a women with light skin tones tend to use the app and try on red lipstick far more often. If individual users are mot tracked and are instead every session is considered as a new user, results may be computed that don't reflect the true trends.

Example 4

Give me the most common {time_frame}, conditioned on {product_colour: red, country: England, category: lipstick, age_bucket: 20-25}.

Meaning: This one is pretty interesting. It can give us insight on when a product or colour is popular, which could be useful for marketing. For instance, the query may indicate that red lipstick is vastly more popular in winter than in summer. If the product feature conditions are not applied in the query, the insight is rather on when users are most active, which is also useful.

Conclusions: Focus on time_frame gives insight on when something is in style, or when users are most active. Focus on time_frame makes sense with any combination of product, user, and meta conditions.

Time_frame may be both a focus and a condition simultaneously. Or rather, time_bucket features may be added to the list, such as time_bucket_season and time_bucket_year. In this case, time_frame would essentially be only useful for conditions, whereas the various time_bucket features would be useful for both focus and conditions.

Example 5

Give me the most common {product_colour, product_colour}, conditioned on {category: lipstick, city: Paris, hair_colour: blonde, action: try_on, time_frame: past_year}.

Meaning: give the lipstick colours that are tried on together most frequently.

Conclusions: Multi-focus on a product feature gives insight on co-popularity (users like the combination of the two). Multi-focus on a product feature always requires an action to be specified, and only one action for the results to be meaningful in any way (i.e. popular relative to what criteria). Multi-focus on a product feature makes sense with any combination of user and meta features conditions.

Example 6

Give me the most common {category, age_bucket}, conditioned on {product_colour: blue, city: Paris, wrinkles: none, action: add_to_cart, time_frame: past_month}.

Meaning: give the category-age_bucket pair that has the strongest co-occurrence given the conditions. Pairing a product feature and a user feature may be useful for finding populations that have distinct and prominent fashion trends (e.g. teenagers in particular love blue lipstick).

Conclusions: Multi-focus on a product feature and user feature gives insight on communities/populations and their fashion trends. Multi-focus on a product feature and user feature makes sense with any combination of user and meta conditions.

Example 7

Give me the most common {product, time_frame}, conditioned on {product_colour: blue, eye_colour: blue}.

Meaning: Give the product-time_frame pair that has the strongest co-occurrence given the conditions. Pairing a product feature and a time_frame may be useful for finding product features that have distinct and prominent temporal trends (e.g. blue makeup shadow sells particularly well in the summer).

Conclusions: Multi-focus on a product feature and time_frame gives insight on products that are more popular during specific times of the year. Multi-focus on a product feature and time_frame makes sense with any combination of user and meta conditions. Similarly to the individual focus on time_frame, this suggests that time_bucket features may be useful.

Example 8

Give me the most common {country, eye_colour}, conditioned on {category: eye_liner, action: purchase}.

Meaning: give the country-eye_colour pair that has the strongest co-occurrence given the conditions.

Conclusions: Multi-focus on a product feature and user feature might give insight on communities/populations and their fashion trends. Multi-focus on a product feature and user feature makes sense with any combination of user, product, and meta conditions. These could give interesting insights for marketing. For example, a focus on eye_colour and hair_colour conditioned on red lipstick might yield useful results for marketing.

Example 9

Give me the most common {city, time_frame}, conditioned on {category: blush}.

Meaning: give any notable spatial-temporal trends.

Conclusions: Multi-focus on a user feature and time_frame might give insight on communities/populations and their fashion trends. Multi-focus on a product feature and user feature makes sense with any combination of user, product, and meta conditions.

Many of these insights may not be useful. The above example can be useful, {age_bucket, timeframe} can be useful, but an example of a pair that might not be as useful is {smile_lines, time_frame}.

Automated Query Generation

In order to automate analysis of data, the disclosed system can, in one embodiment, automatically perform automated query generation and report generation and analysis as follows:

1. Based on previous queries made, or based on a random query which has a random set of constraints and a random dimension of focus, perform a new query. For example, the system could select "face shape" as the dimension of focus, with constraints "lip color tried on=red" and "category=lipsticks". What this would do is to generate a report on the top face shapes where the users try on red lipsticks.

2. Analyze the top data list resulting from the query by comparing the likelihood of occurrence of the data to a specific threshold. For example, if the threshold is set to 2%, then any data returned whose occurrence likelihood is above 2% would be analyzed.

3. Based on the analysis of the above step, if any data points exceed the set threshold, then a report is generated and sent. If on the other hand no data is above the threshold, then the automatic query is reset.

Query Caching and Relational Memory

Whether the queries are automatically generated from a prior query or randomly, as outlined previously, it is useful to cache the queries and store the query results for the most popular query sets. In one extreme, all possible query results could be cached which would remove the need for the raw data to be stored. In a more practical scenario, only the most useful query results (based on past query history, or directly entered by a domain expert) along with a few random/automated query results would be stored. This way, the raw data would not be needed to be stored, AND, the queries would be pre-generated and available at an instant at any time, thereby minimizing both storage requirements and processing requirements. In this way, the stored data would be a form of relational memory where the relation between different query parameters would manifest itself in the query results.

Figure 11:
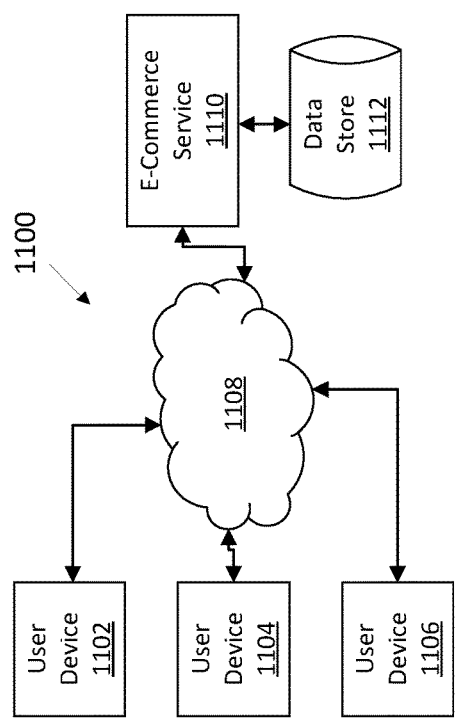
FIG. 11 is a block diagram of a computer network system in accordance with an embodiment.

FIG. 11 illustrates a network computer system 1100 comprising a plurality of user computing devices 1102, 1104 and 1106 communicating via a network 1108 to purchase products from an e-commerce service system 1110 having a data store (e.g. a database) 1112 in accordance with an embodiment. It will be appreciated that the system 1100 is simplified for clarity.

In the example of FIG. 11, user computing devices (e.g. 1102) are mobile phones. Other examples of user computing devices may be a tablet computer, a personal digital assistant (PDA), a laptop computer, a tabletop computer, a portable gaming device, a portable media player, an e-book reader, a watch, a kiosk such as an in-store device or another type of computing device. In the example of FIG. 11, system 1110 is one or more servers, mainframes or other back end computing devices. However, components of the system may be performed on personal computers, workstations, laptops, etc. as well as network components (all not shown). Each of these is an example of a computing device having at least one processing device and memory.

Computing device 1102 is coupled for communication to a wide area network (WAN) 108 such as the Internet. Network 1108 is coupled for communication with a plurality of computing devices (e.g. system 1110). It is understood that representative communication network 1108 is simplified for illustrative purposes. Additional networks may also be coupled to network 1108 such as a wireless network between WAN 1108 and computing device 1102 (not shown).

System 1110 may be configured to perform one or more operations as instructed by computing device 1102 (for example in a message communicated from device 102). Typically, computing device 1102 requests e-commerce data such as product data, and may communicate selections and other actions (gaze, try on, place in cart, purchase). Data may be displayed in a GUI on device 1102. Other data communicated from computing device 1102 may include user data such as picture, profile data, etc. In some embodiments, computing device 1102 and e-commerce service 1110 are configured as a web based implementation using a browser or browser based application to communicate with a website provided by service system 1110. In other embodiments, computer device 1102 may have a native application to communicate for the e-commerce service. In one example, system 1110 may be configured to store data to a data store 1112, comprising a database, as a server-side component of an e-commerce system.

Figure 12:
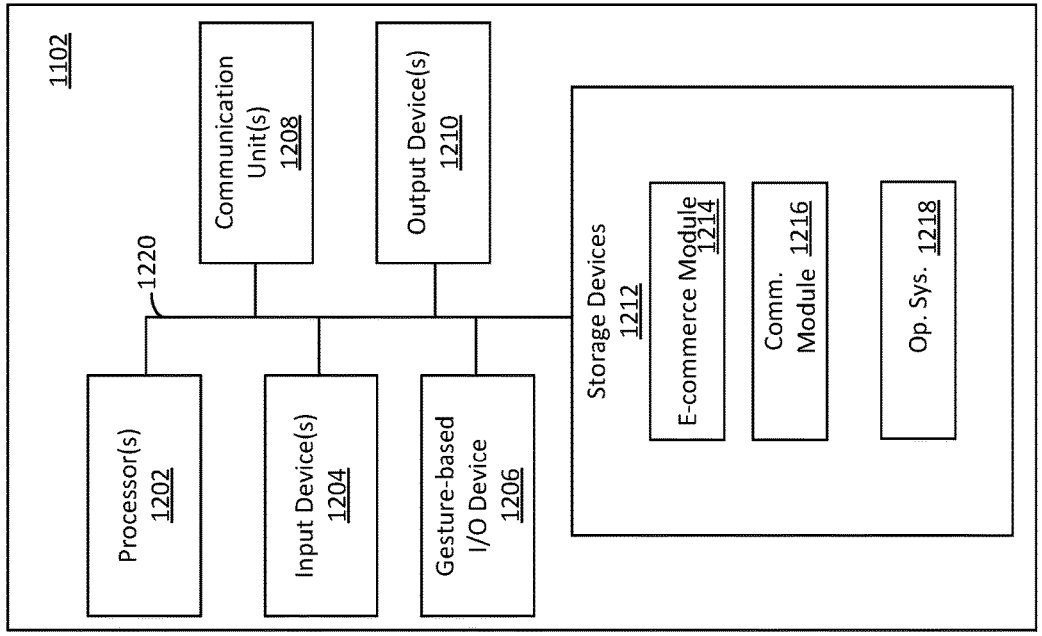
FIG. 12 is a block diagram of a user device component of FIG. 11 in accordance with an embodiment.

FIG. 12 is a block diagram illustrating an example computing device (e.g. 1102), in accordance with one or more aspects of the present disclosure, for example, to provide a system to perform e-commerce shopping. Computing device 1102 comprises one or more processors 1202, one or more input devices 1204, gesture-based I/O device 1206, one or more communication units 1208 and one or more output devices 1210. Computing device 1102 also includes one or more storage devices 1212 storing one or more modules such as e-commerce module 1214 (e.g. a browser or application), communication module 1216 and operating system 1218. Communication channels 1220 may couple each of the components for inter-component communications, whether communicatively, physically and/or operatively. In some examples, communication channels 1220 may include a system bus, a network connection, an inter-process communication data structure, or any other method for communicating data.

One or more processors 1202 may implement functionality and/or execute instructions within computing device 1102. For example, processors 1202 may be configured to receive instructions and/or data from storage devices 1212 to execute the functionality of the modules shown in FIG. 12, among others (e.g. applications, etc.) Computing device 1102 may store data/information to storage devices 1212 (not shown). Some of the functionality is described further herein below.

One or more communication units 1208 may communicate with external devices such as servers or other computers of system 1110, etc. via one or more networks (e.g. 1108) by transmitting and/or receiving network signals on the one or more networks. The communication units may include various antennae and/or network interface cards, etc. for wireless and/or wired communications.

Input and output devices may include any of one or more buttons, switches, pointing devices, cameras (e.g. for user phots to simulate trying on make up), a keyboard, a microphone, one or more sensors (e.g. biometric, etc.) a speaker, a bell, one or more lights, etc. One or more of same may be coupled via a universal serial bus (USB) or other communication channel (e.g. 220). One Input/Output (I/O) device is a gesture based I/O device 1206 such as a touch enabled display screen which can be implemented using various well-known technologies.

The one or more storage devices 1212 may store instructions and/or data for processing during operation of computing device 1102. The one or more storage devices may take different forms and/or configurations, for example, as short-term memory or long-term memory. Storage devices 1212 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

E-commerce module 1212 may present a user interface and receive gesture input via gesture-based I/O device 1206. Certain information to present in the user interface may be obtained from system 1110.

It is understood that operations may not fall exactly within the modules 1214-1218 of FIG. 2 such that one module may assist with the functionality of another.

Figure 13:
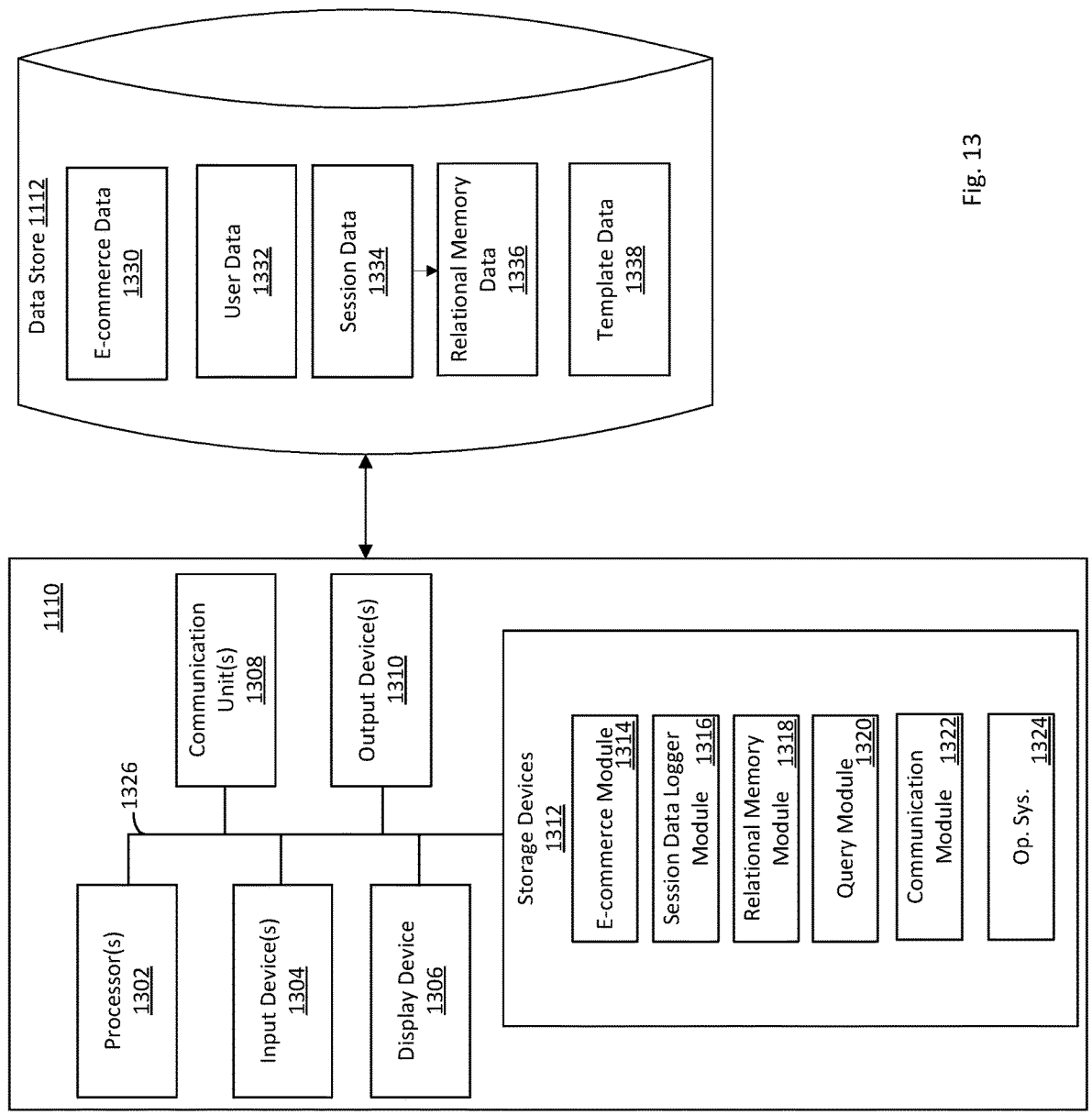
FIG. 13 is a block diagram of a computing system component and a data store component of FIG. 11 in accordance with an embodiment.

FIG. 13 is a block diagram of system 1110 and data store 1112 in accordance with one or more aspects of the present disclosure, for example, to provide a system to perform e-commerce shopping. Data store may comprise more than one component. For example portions of data store 1112 are a relational database.

System 1110 comprises one or more processors 1302, one or more input devices 1304, display device 1306, one or more communication units 1308 and one or more output devices 1310. System 1110 also includes one or more storage devices 1312 storing one or more modules such as e-commerce module 1314 (e.g. for a web site or responding to messages of an application), session data logger module 1316, relational memory module 1318, query module 1320 and communication module 1322 and operating system 1324. Communication channels 1326 may couple each of the components for inter-component communications, whether communicatively, physically and/or operatively. In some examples, communication channels 1326 may include a system bus, a network connection, an inter-process communication data structure, or any other method for communicating data.

Data store 1112 as noted may be more than one component of different types. Data store 1112 sores e-commerce data 1330, user data 1332, session data 1334, relation memory data 1336 and template data 1338. E-commerce data may include product and other data for the e-commerce functionality. User data 1332 includes user profile data, user images (e.g. face) and data (e.g. measurements/conclusions drawn from analyzing user photos or from received user input) associated with user characteristics such as face shape, smile lines, eye colour, skin tone, etc. Session data 1334 relates to data generated from an instances of shopping sessions by users and typically includes associated user data for each instance. This data is stored sequentially as described.

Relational memory data 1336 comprises relationships determined from the sessional data as described. Template data 1338 includes report or other templates for presenting relational memory data (e.g. from canned or ad hoc queries) as output as described (e.g. see FIG. 2).

E-commerce module 1314 may implement a website or communicate with a shopping application on devices 1102-1106. E-commerce module 1314 may utilize e-commerce data 1330 to present products, etc. E-commerce module 1314 may receive user input which define session data including actions and/or user data (e.g. profile updates, images, etc.) Session data logger module 1316 may write session data 1334 sequentially.

Relational memory module 1318 may take as input session data and user data to define relational memory data, computing relationships for example to determine trends and associations between data points in the session data and user data over various time periods, locations, etc. as described. Relational memory module 1318 may be configured to compute relativity measures for a plurality of subsets of data attributes of the user data and session data, each subset comprising two or more data attributes (e.g. selected user data attributes and sessional data attributes, selected user data attributes or selected sessional data attributes). The relativity measures individually or when combined represent conditional relativities between a set of events within the session data. Only the relativity measures (rather than the raw user data and sessional data) may be stored to the relational memory. The relational memory may be stored in a manner such that the data attributes or relationships between two or more data attributes may be used as constraints in a query to search the relational memory.

Relational memory module 1318 may be configured to periodically compute the relativity measures for storing to the relational memory. All possible relations may be calculated and the strongest (most relevant) ones stored to the relational memory. Thereafter it becomes a simple lookup for the data. Relational memory module 1318 may be configured to periodically produce reports automatically etc. using the templates 1338 for sending via email, etc.

Query module 1320 accepts queries (e.g. 610) to generate output (e.g. 612 or 614). Communication module 1332 communicates with data store 1112 as well as user computing devices 1102-1106.

Any of the modules herein may be defined as software (instructions for execution by one or more processors) or hardware or combinations thereof. Instructions may be stored in a non-transient manner such as in a memory or other storage device or in a transient manner such as in a signal. When executed by the one or more processors, the instructions configure operations of the respective computing device or system (e.g. devices 1102-106 or system 1110).

Though illustrated as a single system 1110 it is understood that the features and functions may be implemented by more than one computing device as aforesaid. Thus the e-commerce module providing the e-commerce service may be executing on one component of system 1110 and communicate queries to another component implementing the query module to receive relationship measurement data (i.e. from relational memory data 1336) in response. This relationship measurement data may be used to determine instances of or the order of instances of the e-commerce data to be presented to the user devices 1102-1106.

Figure 14:
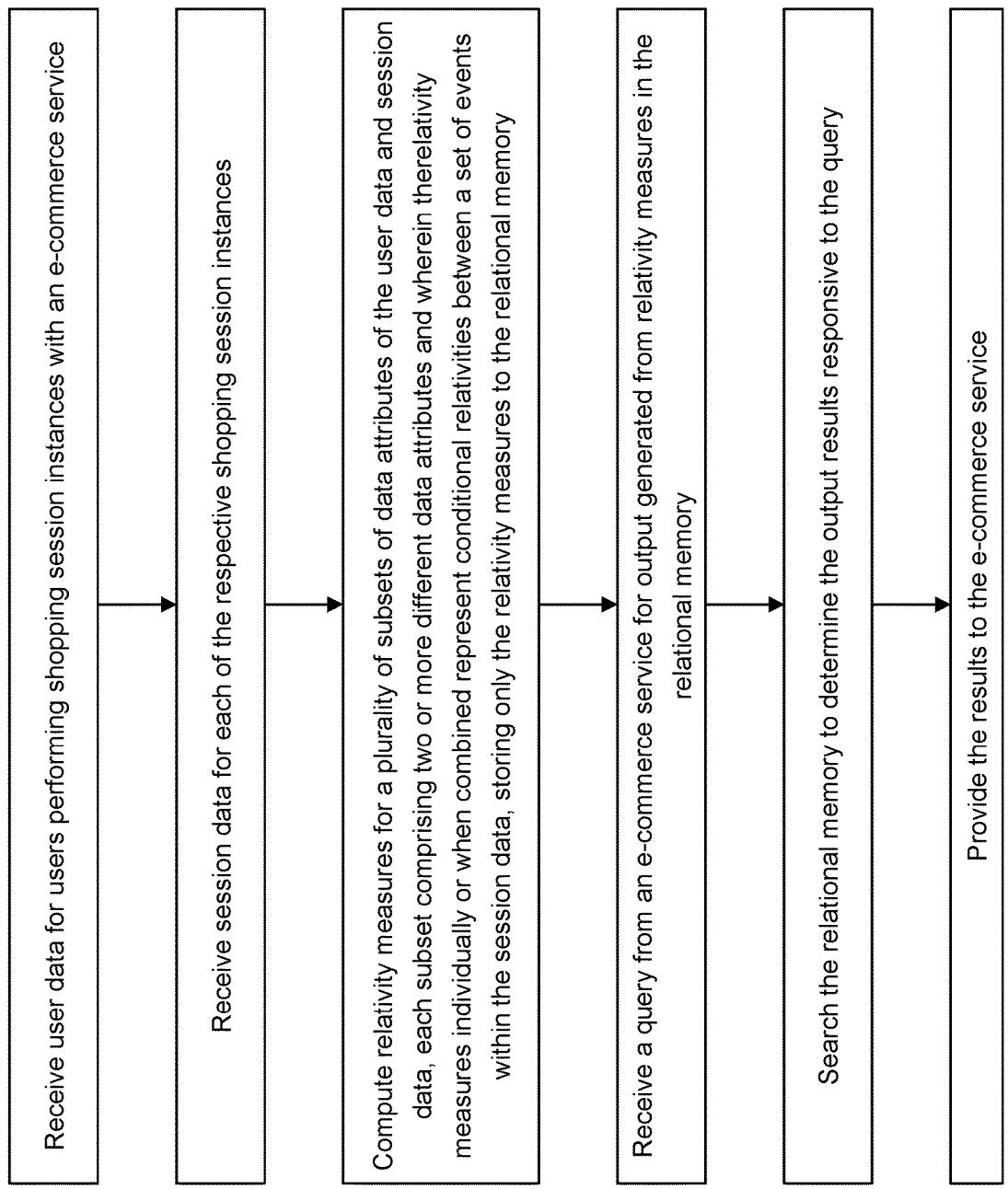
FIG. 14 is a flow chart of operations the computing device component of FIG. 11 in accordance with an embodiment.

FIG. 14 is a flow chart of operations 1400 of a system component such as system 1100 of FIG. 11 in accordance with an embodiment. The operations 1400 may be performed by a computing system comprising one or more processors coupled to a storage device storing instructions which when executed by the one or more processors configure the computing system. At 1402 operations receive user data for users performing shopping session instances with an e-commerce service. At 1404 operations receive session data for each of the respective shopping session instances. At 1406 operations compute relativity measures for a plurality of subsets of data attributes of the user data and session data, each subset comprising two or more data attributes and wherein the relativity measures individually or when combined represent conditional relativities between a set of events within the session data. Operations store only the relativity measures to the relational memory.

At 1408 operations receive a query from an e-commerce service for output generated from the relational memory. At 1410 operations search the relational memory to determine the output results responsive to the query; and at 1412 operations provide the results to the e-commerce service. The term search here need not mean a pure look up of stored data. Queries in a relational database context may be more complex. For example some mathematical computing may be undertaken (e.g. to determine a percentage from counts stored), etc.

Operations 1402-1406 may be provided by one component of the system and operations 1408-1412 by another component.

The relativity measures may be stored without storing the user data and session data to the relational memory.

The e-commerce service may provide product data to user computing devices (e.g. 1102-1106) for presentation. The results may be used by the e-commerce service to determine which specific product data to provide or determine an order of the presentation of the specific product data. The system performing operations 1400 may be configured to provide the e-commerce service. The events in respective particular shopping session instances may comprise one or more actions taken by the respective users associated with the respective particular shopping session instances in relation to one or more specific products. The one or more actions may comprise any one of browse/gaze, try-on, add to cart, purchase, rate product or equivalent actions in relation to the one or more specific products. The events may be ordered temporally.

The session data may further comprise one or more of product data, product category data, session length data, location data, and session date data.

The user data may comprise one or more of user purchase history data, user age data, gender data and user physical attribute data.

A query may comprise one or more constraints for searching the relational memory. A constraint may comprise a data attribute of the user data or session data or a relationship between two or more data attributes.

The system may stores relativity measures only for predetermined relations between particular data attributes, the predetermined relations selected to give desired trends and insights into user shopping using the e-commerce service.

It is understood that relativity measures may include data such as counts of instances of: i) data attributes in the user data and session data or 2) relations between two or more such attributes. For example, counts of users, counts of shopping instances performed by a particularly user (which may be further particularized to couts by various actions, etc.), counts by location, counts of events (e.g. gazes, try on, purchases) of a particular product, or category, etc.).

The e-commerce service may be a virtual try-on application for make-up. User computing devices may be configured to display images of a user or a model image which images may be modified to present make-up as if it is applied to the user or model. Using image processing techniques, a user image (e.g. sent from the user device for example after capture by a camera) is processed to render make-up effects of one or more make-up products.

An example of such a virtual try on application is the "Sephora Virtual Artist" application available from Sephora USA, Inc. An example of a web-based e-commerce product page try-on feature is available from Estee Lauder (e.g. https://www.esteelauder.com/product/649/46704/product-catalog/makeup/lips/lipstick/pure-color-love/lipstick#/shade/Haute-Cold---Shimmer-Pearl).

By pre-computing the relativity measures and storing as relational data, the measurements may be queried and results therefrom used to dynamically determine content for the user computing devices. The pre-computing and relational data storage may improve efficiency/operation of the e-commerce system such as by enabling quicker determination of optimized product data (selection of which products to serve to the computing devices 1102-1106). It may improve efficiency/operations by reducing the amount of product related data to be communicated to the computing devices. Similarly in may improve efficiency/operations of the computing devices by reducing the amount of product data to be received and displayed.

Conclusions and Future Work

In this paper, we proposed a very simple method for learning relationships between events by accounting for the temporal sequence of occurrence of the events. The underlying idea behind our proposed method was that for certain data processing application, such as data collected from retail shoppers, relational access to data is more useful and immediately informative than sequential access.

One interesting application of the work presented here is the development of a physical implementation of REM. The idea here is that relational memory would store information sequentially, but queries to this memory would be made based on relativities between different events as per the methods outlined earlier here. So, for example, the tags and locations of objects in each image would be stored sequentially in REM, but retrieval would consist of looking up the relativity between two specific tags. REM could significant reduce the computational burden for relational data processing tasks. As a side note, it is the author's opinion that REM would be a much closer approximation of human memory than typical Random Access Memories that are used in traditional computing systems. We humans do not recall the exact pixel of an image we saw a few days ago, but to remember relationships, commonalities, and general summaries of our experiences. REM is a means of building a similar memory digitally. Another avenue of future development is comparison to other recommender system methods, which share certain functional elements with the methods discuss here.

REFERENCES

[1] Cho, Yoon Ho, and Jae Kyeong Kim. "Application of Web usage mining and product taxonomy to collaborative recommendations in e-commerce." *Expert systems with Applications* 26.2 (2004): 233-246.

[2] Yadav, Mahendra Pratap, Mhd Feeroz, and Vinod Kumar Yaday. "Mining the customer behavior using web usage mining in e-commerce." *Computing Communication & Networking Technologies (ICCCNT)*, 2012 *Third International Conference on*. IEEE, 2012.

[3] Niu, Li, et al. "Product hierarchy-based customer profiles for electronic commerce recommendation." *Machine Learning and Cybernetics*, 2002. *Proceedings.* 2002 *International Conference on*. Vol. 2. IEEE, 2002.

[4] Lin, Koung-Lung, et al. "A recommender for targeted advertisement of unsought products in e-commerce." *E-Commerce Technology*, 2005. *CEC* 2005. *Seventh IEEE International Conference on*. IEEE, 2005.

[5] Ha, Jung-Woo, Hyuna Pyo, and Jeonghee Kim. "Large-scale item categorization in e-commerce using multiple recurrent neural networks." *Proceedings of the 22nd ACM SIGKDD International Conference on Knowledge Discovery and Data Mining*. ACM, 2016.

[6] Kim, Jae Kyeong, et al. "A personalized recommendation procedure for Internet shopping support." *Electronic commerce research and applications* 1.3 (2003): 301-313.

[7] Liu, Guimei, et al. "Repeat buyer prediction for e-commerce." Proceedings of the 22nd ACM SIGKDD International Conference on Knowledge Discovery and Data Mining. ACM, 2016.

[8] Kumar, Shailesh, Edmond D. Chow, and Michinari Momma. "Method and apparatus for retail data mining using pair-wise co-occurrence consistency." U.S. Pat. No. 7,672,865. 2 Mar. 2010.

[9] Ogle, Virginia E., and Michael Stonebraker. "Chabot: Retrieval from a relational database of images." *Computer* 28.9 (1995): 40-48.

[10] Schmidt, Lawrence F. "System and method for enhanced performance of a relational database management system through the use of application-specific memory-resident data." U.S. Pat. No. 6,304,867. 16 Oct. 2001.

[11] LeCun, Yann, Yoshua Bengio, and Geoffrey Hinton. "Deep learning." *Nature* 521.7553 (2015): 436-444.

[12] Konkel, Alex, and Neal J. Cohen. "Relational memory and the hippocampus: representations and methods." Frontiers in neuroscience 3.2 (2009): 166.

[13] Hannula, Deborah E., Daniel Tranel, and Neal J. Cohen. "The long and the short of it: relational memory impairments in amnesia, even at short lags." Journal of Neuroscience 26.32 (2006): 8352-8359.

What is claimed is:

1. A computing system comprising one or more processors coupled to a storage device storing instructions which when executed by the one or more processors configure the computing system to:
   receive user data for users performing shopping session instances with an e-commerce service from a respective user device for each of the users that includes at least a display and a camera, wherein the e-commerce service is a virtual try-on application for make-up;
   receive session data for each of the respective shopping session instances, the session data including events detected by the respective user device in respective particular shopping session instances in which one or more actions, from a group of actions detectable by the user device, taken by the respective users are associated with the respective particular shopping session instances in relation to one or more specific make-up products, wherein the group of actions detectable by the user devices include at least a browse/gaze of a product name detected by eye-tracking and a virtual try-on of the one or more specific make-up products during a respective shopping session;
   compute relativity measures for a plurality of subsets of data attributes of the user data and session data, each subset comprising two or more data attributes, wherein the relativity measures individually or when combined represent conditional relativities between a set of events within the session data;
   store, in a relational memory, the computed relativity measures, wherein the relational memory stores only the computed relativity measures without storing the received user data and the received session data;
   receive a query from an e-commerce service, the query defining a requested output;
   search the relational memory for relativity measures relevant to the requested output based on the received query;
   generate output results for the requested output of the query based on the relevant relativity measures;
   cache into a memory the query and the output results for future use;
   and,
   provide the output results to the e-commerce service, the output results comprising information associated with product data to be displayed on one or more of the user devices.

2. The system of claim 1 wherein the system is configured to provide the e-commerce service.

3. The system of claim 1 wherein the group of actions detectable by the user device further includes at least one of add to cart and purchase or equivalent actions in relation to the one or more specific make-up products.

4. The system of claim 3 wherein session data further comprises one or more of product data, product category data, session length data, location data, and session date data.

5. The system of claim 1 wherein the events are ordered temporally.

6. The system of claim 1 wherein the user data comprises one or more of user purchase history data, user age data, gender data and user physical attribute data.

7. The system of claim 1 wherein the query comprises one or more constraints for searching the relational memory.

8. The system of claim 7 wherein a constraint comprises a data attribute of the user data or session data or a relationship between two or more such data attributes.

9. The system of claim 1 wherein the system stores relativity measures only for pre-selected relations between particular data attributes, the pre-selected relations selected to give desired trends and insights into user shopping using the e-commerce service.

10. A computer-implemented method comprising:
    receiving by one or more processors user data for users performing shopping session instances associated with an e-commerce service, the user data received from a respective user device for each of the users that includes at least a display and a camera, wherein the e-commerce service is a virtual try-on application for make-up;
    receiving by one or more processors session data for each of the respective shopping session instances, the session data including events detected by the respective user device in respective particular shopping session instances in which one or more actions, from a group of actions detectable by the user device, taken by the respective users are associated with the respective particular shopping session instances in relation to one or more specific make-up products, wherein the group of actions detectable by the user device include at least a browse/gaze of a product name detected by eye-tracking and a virtual try-on of the one or more specific make-up products during a shopping session;
    computing by one or more processors relativity measures for a plurality of subsets of data attributes of the user data and session data, each subset comprising two or more data attributes, wherein the relativity measures individually or when combined represent conditional relativities between a set of events within the session data;
    storing, in a relational memory, the computed relativity measures, wherein the relational memory stores only the computed relativity measures without storing the received user data and the received session data;
    receiving by one or more processors a query from an e-commerce service, the query defining a request output;

searching by one or more processors the relational memory for relativity measures relevant to the requested output based on the received query;

generating by one or more processors output results for the requested output of the query based on the relevant relativity measures;

caching by one or more processors into a memory the query and the output results for future use; and, providing by one or more processors the output results to the e-commerce service, the output results comprising information associated with product data to be displayed on one or more of the user devices based on the results.

11. The method of claim 10 further comprising providing by one or more processors the e-commerce service.

12. The method of claim 10 wherein the group of actions detectable by the user device further includes at least one of add to cart and purchase or equivalent actions in relation to the one or more specific make-up products.

13. The method of claim 12 wherein session data further comprises one or more of product data, product category data, session length data, location data, and session date data.

14. The method of claim 10 wherein the events are ordered temporally.

15. The method of claim 10 wherein the user data comprises one or more of user purchase history data, user age data, gender data and user physical attribute data.

16. The method of claim 10 wherein the query comprises one or more constraints for searching the relational memory.

17. The method of claim 16 wherein a constraint comprises a data attribute of the user data or session data or a relationship between two or more such data attributes.

18. The method of claim 10 wherein the one or more processors store relativity measures only for pre-selected relations between particular data attributes, the preselected relations selected to give desired trends and insights into user shopping using the e-commerce service.

* * * * *